(12) United States Patent
Edwards (10) Patent No.: US 7,518,616 B1
(45) Date of Patent: Apr. 14, 2009

(54) GRAPHICS PROCESSOR WITH TEXTURE MEMORY ALLOCATION SYSTEM

(75) Inventor: Stephen W. Edwards, Madison, AL (US)

(73) Assignee: 3DLabs, Inc. Ltd., Reid Hall, Hamilton (BM)

( * ) Notice: Subject to any disclaimer, the term of this patent is extended or adjusted under 35 U.S.C. 154(b) by 0 days.

(21) Appl. No.: 09/353,887

(22) Filed: Jul. 15, 1999

Related U.S. Application Data (60) Provisional application No. 60/093,159, filed on Jul. 17, 1998.

(51) Int. Cl.
*G09G 5/00* (2006.01)
(52) U.S. Cl. ...................................... 345/582; 345/552
(58) Field of Classification Search ................ 345/430, 345/425, 429, 582, 552
See application file for complete search history.

(56) References Cited

U.S. PATENT DOCUMENTS

| | | | |
|---|---|---|---|
| 4,434,437 A | 2/1984 | Strolle et al. ................ 358/140 |
| 4,615,013 A | 9/1986 | Yan et al. .................... 364/521 |
| 4,646,232 A | 2/1987 | Chang et al. ................ 364/200 |
| 4,908,780 A | 3/1990 | Priem et al. ................. 364/521 |
| 4,918,626 A | 4/1990 | Watkins et al. ............. 364/522 |
| 4,991,122 A | 2/1991 | Sanders ...................... 364/521 |
| 5,107,415 A | 4/1992 | Sato et al. ................... 395/800 |
| 5,123,085 A | 6/1992 | Wells et al. ................. 395/121 |
| 5,239,654 A | 8/1993 | Ing-Simmons et al. ...... 395/800 |
| 5,287,438 A | 2/1994 | Kelleher ..................... 395/132 |
| 5,293,480 A | 3/1994 | Miller et al. ................ 395/163 |
| 5,313,551 A | 5/1994 | Labrousse et al. .......... 395/425 |
| 5,363,475 A | 11/1994 | Baker et al. ................ 395/122 |
| 5,371,840 A | 12/1994 | Fischer et al. .............. 395/133 |
| 5,394,524 A | 2/1995 | DiNicola et al. ............ 395/163 |
| 5,398,328 A | 3/1995 | Weber et al. ................ 395/500 |
| 5,446,479 A | 8/1995 | Thompson et al. .......... 345/139 |
| 5,461,712 A * | 10/1995 | Chelstowski et al. ........ 345/543 |
| 5,485,559 A | 1/1996 | Sakaibara et al. ........... 395/133 |
| 5,495,563 A * | 2/1996 | Winser ....................... 345/582 |
| 5,511,165 A | 4/1996 | Brady et al. ........... 395/200.01 |
| 5,519,823 A | 5/1996 | Barkans ...................... 395/143 |
| 5,544,294 A | 8/1996 | Cho et al. ................... 395/141 |
| 5,550,961 A * | 8/1996 | Chimoto ..................... 395/133 |
| 5,555,359 A | 9/1996 | Choi et al. .................. 395/141 |
| 5,557,734 A | 9/1996 | Wilson ....................... 395/162 |
| 5,561,749 A | 10/1996 | Schroeder ................... 395/120 |
| 5,572,713 A | 11/1996 | Weber et al. ................ 395/500 |
| 5,631,693 A | 5/1997 | Wunderlich et al. ............ 348/7 |
| 5,664,114 A | 9/1997 | Krech, Jr. et al. ...... 395/200.64 |

(Continued)

FOREIGN PATENT DOCUMENTS

EP          0 311 798 A2      4/1989

(Continued)

*Primary Examiner*—Jeffery A. Brier
(74) *Attorney, Agent, or Firm*—Groover & Associates (57) ABSTRACT

A graphics accelerator for processing a graphical image includes a texture buffer for storing texture maps and data relating to the texture maps stored in the texture buffer, and a texture processor that performs texturing operations on the graphical image. The texture processor includes a fetching engine that retrieves texture packets, where each texture packet is stored in the texture buffer and associated with a texture map. Each texture packet includes data relating to the location of its associated texture map in the texture buffer.

8 Claims, 6 Drawing Sheets

U.S. PATENT DOCUMENTS

| | | | | |
|---|---|---|---|---|
| 5,666,520 | A | 9/1997 | Fujita et al. | 345/513 |
| 5,684,939 | A | 11/1997 | Foran et al. | 395/131 |
| 5,701,365 | A | 12/1997 | Harrington et al. | 382/212 |
| 5,706,481 | A | 1/1998 | Hannah et al. | 395/519 |
| 5,721,812 | A | 2/1998 | Mochizuki | 395/110 |
| 5,737,455 | A | 4/1998 | Harrington et al. | 385/284 |
| 5,757,375 | A | 5/1998 | Kawase | 345/429 |
| 5,757,385 | A | 5/1998 | Narayanaswami et al. | 345/505 |
| 5,761,401 | A * | 6/1998 | Kobayashi et al. | 345/630 |
| 5,764,237 | A * | 6/1998 | Kaneko | 345/430 |
| 5,790,130 | A * | 8/1998 | Gannett | 345/587 |
| 5,793,376 | A * | 8/1998 | Tanaka et al. | 345/430 |
| 5,801,708 | A * | 9/1998 | Alcorn et al. | 345/430 |
| 5,821,950 | A | 10/1998 | Rentschler et al. | 345/505 |
| 5,831,637 | A * | 11/1998 | Young et al. | 345/501 |
| 5,841,444 | A | 11/1998 | Mun et al. | 345/506 |
| 5,870,567 | A | 2/1999 | Hausauer et al. | 395/281 |
| 5,877,771 | A * | 3/1999 | Drebin et al. | 345/430 |
| 5,883,641 | A | 3/1999 | Krech, Jr. et al. | 345/505 |
| 5,886,705 | A * | 3/1999 | Lentz | 345/582 |
| 5,914,711 | A | 6/1999 | Mangerson et al. | 345/203 |
| 5,917,497 | A * | 6/1999 | Saunders | 345/430 |
| 6,005,583 | A * | 12/1999 | Morrison | 345/430 |
| 6,046,747 | A * | 4/2000 | Saunders et al. | 345/582 |
| 6,052,126 | A * | 4/2000 | Sakuraba et al. | 345/430 |
| 6,104,415 | A * | 8/2000 | Gossett | 345/513 |
| 6,121,974 | A * | 9/2000 | Shaw | 345/582 |
| 6,130,680 | A * | 10/2000 | Cox et al. | 345/511 |
| 6,141,025 | A * | 10/2000 | Oka et al. | 345/521 |
| 6,144,392 | A * | 11/2000 | Rogers | 345/511 |
| 6,184,888 | B1 * | 2/2001 | Yuasa et al. | 345/419 |
| 6,191,794 | B1 * | 2/2001 | Priem et al. | 345/430 |
| 6,233,647 | B1 * | 5/2001 | Bentz et al. | 345/557 |
| 6,362,828 | B1 * | 3/2002 | Morgan | 345/582 |

FOREIGN PATENT DOCUMENTS

| | | |
|---|---|---|
| EP | 0 397 180 A2 | 11/1990 |
| EP | 0 438 194 A2 | 6/1991 |
| EP | 0 448 286 A2 | 9/1991 |
| EP | 0 463 700 A2 | 1/1992 |
| EP | 0 566 229 A2 | 10/1993 |
| EP | 0 627 682 A1 | 12/1994 |
| EP | 0 631 252 A2 | 12/1994 |
| EP | 0 693 737 A2 | 1/1996 |
| EP | 0 734 008 A1 | 9/1996 |
| EP | 0 735 463 A2 | 10/1996 |
| EP | 0 810 553 AS | 12/1997 |
| EP | 0 817 009 A2 | 1/1998 |
| EP | 0 825 550 A2 | 2/1998 |
| EP | 0 840 279 A2 | 5/1998 |
| WO | WO 86/07646 | 12/1986 |
| WO | WO 92/00570 | 1/1992 |
| WO | WO 93/06553 | 4/1993 |
| WO | WO 97/21192 | 6/1997 |

* cited by examiner

| | | | | |
|---|---|---|---|---|
| 1 | 2 | 3 | 4 | 5 |
| 6 | 7 | 8 | 9 | 10 |
| 11 | 12 | 13 | 14 | 15 |
| 16 | 17 | 18 | 19 | 20 |

← Texture Map

GRAPHICS PROCESSOR WITH TEXTURE MEMORY ALLOCATION SYSTEM

PRIORITY

This application claims priority from U.S. provisional patent application Ser. No. 60/093,159, filed Jul. 17, 1998, entitled "GRAPHICS PROCESSOR WITH TEXTURE MEMORY ALLOCATION SYSTEM", the disclosure of which is incorporated herein, in its entirety, by reference.

FIELD OF THE INVENTION

The invention generally relates to computer systems and, more particularly, the invention relates to processing graphics request data for display on a computer display device.

BACKGROUND OF THE INVENTION

Many conventional three dimensional graphics processing programs apply textures to graphical images to provide more realistic images. Textures typically are applied to graphical images by mapping a texture map to the graphical image. Texture maps typically are stored in volatile texture memory on a graphics accelerator and applied to graphical images by a local texture processor.

When a selected texture map is required, a program typically determines the location and type of texture map (e.g., its dimensional type) in the texture memory. Once this information is determined, the program transmits a message to the texture processor with this information. Upon receipt of the message by the texture processor, the texture map is retrieved and applied to a graphical image of interest. Transmitting the message to the texture processor, however, requires bus bandwidth that preferably is utilized for transmitting other graphics request code.

In addition, texture memory commonly is configured as linear memory (i.e., one dimensional). Many texture maps, however, are two and three dimensions. Storing a higher dimensioned texture map (i.e., higher than one dimension) in linear texture memory thus often results in an inefficient allocation of memory resources. More particularly, many memory locations undesirably are not used when storing higher dimensioned texture maps in linear texture memory.

SUMMARY OF THE INVENTION

In accordance with one aspect of the invention, a graphics accelerator for processing a graphical image includes a texture buffer for storing texture maps and data relating to the texture maps stored in the texture buffer, and a texture processor that performs texturing operations on the graphical image. The texture processor includes a fetching engine that retrieves texture packets, where each texture packet is stored in the texture buffer and associated with a texture map. Each texture packet includes data relating to the location of its associated texture map in the texture buffer.

In preferred embodiments of the invention, each texture packet is associated with a texture map that is different than the texture maps associated with any other texture packet in the texture buffer. Moreover, each texture packet may include data relating to the dimensional type of its associated texture map. Among other things, the dimensional type of each texture map may be one of a one dimensional texture map, a two dimensional texture map, and a three dimensional texture map.

In other embodiments, the texture processor further includes an input for receiving a texture message indicating that a texture map is to be utilized by the texture processor. The fetching engine retrieves selected texture packets from the texture buffer in response to receipt of the texture message. The texture processor also may include a parsing engine for parsing a fetched texture packet and determining information relating to the texture map associated with the fetched texture packet. In preferred embodiments, the information relates to the location in the texture buffer of the texture map associated with the fetched texture packet. The information also may relate to the number of dimensions of the texture map associated with the fetched texture packet.

In accordance with other aspects of the invention, a graphics accelerator for processing a graphical image includes a texture buffer for storing texture maps and data relating to the texture maps stored in the texture buffer, and a texture processor that performs texturing operations on the graphical image. The texture processor includes a texture packet generator that produces texture packets, where each texture packet is stored in the texture buffer and associated with a texture map. Each texture packet includes data relating to the dimensional type of its associated texture map.

In accordance with still other aspects of the invention, a graphics accelerator stores a texture map in linear texture memory of a graphics accelerator by first determining the dimension of the texture map, and then converting the texture map to a one dimensional texture map if the dimension of the texture map is determined to be more than one dimensional. The one dimensional texture map has a first number of consecutive data blocks. A second number of consecutive memory locations in the texture memory then are located, where the first number is equal to the second number. Once the consecutive memory locations are located, then the one dimensional texture map is stored in the located memory locations in the texture memory.

In preferred embodiments, a texture map is converted to a one dimensional texture map by first defining a plurality of data blocks within the texture map, and then assigning a sequence number to each of the data blocks. The sequence numbers preferably are consecutive numbers. In preferred embodiments, each consecutive data block of the one dimensional texture map is consecutively stored in the located memory locations.

In accordance with another aspect of the invention, an apparatus and method of applying a texture to a graphical image first locates a texture packet identifying the location of a texture map in a memory device. The texture packet then is parsed to determine the location of the texture map in the memory device. Once its location is determined, the texture map is retrieved and applied to the graphical image.

In accordance with still another aspect of the invention, a data structure is utilized to store data relating to a texture map. More particularly, the data structure includes a location field identifying the location of the texture map in a memory device, and a dimension field identifying the dimension of the texture map.

BRIEF DESCRIPTION OF THE DRAWINGS

The foregoing and other objects and advantages of the invention will be appreciated more fully from the following further description thereof with reference to the accompanying drawings wherein.

DESCRIPTION OF PREFERRED EMBODIMENTS

Figure 1:
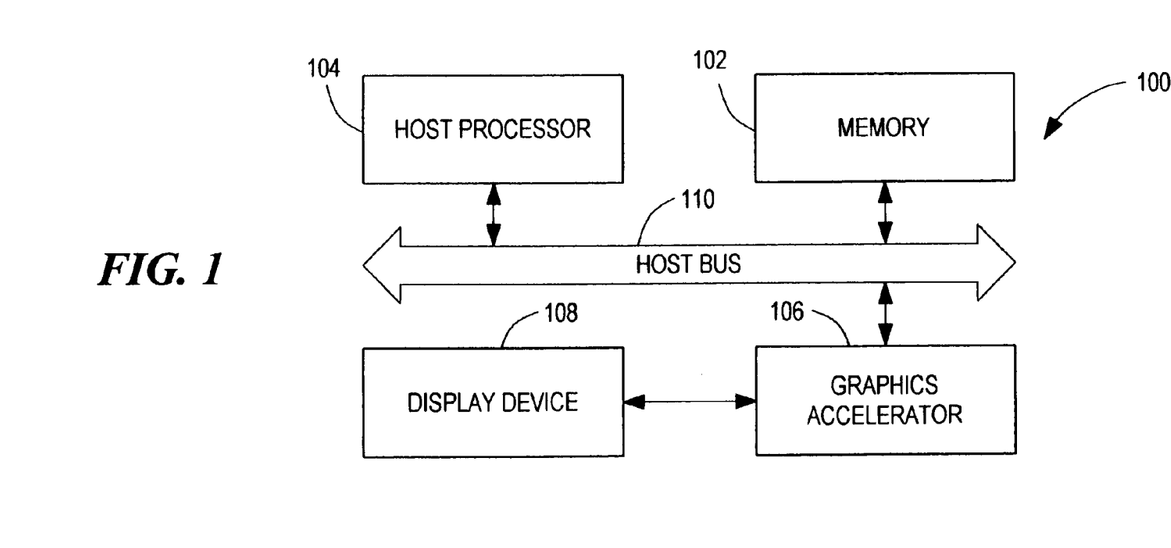
FIG. 1 schematically shows a portion of an exemplary computer system on which preferred embodiments of the invention may be implemented.

FIG. 1 shows a portion of an exemplary computer system 100 on which preferred embodiments of the invention may be implemented. More particularly, the computer system 100 includes a host processor 104 (i.e., a central processing unit) for executing application level programs and system functions, volatile host memory 102 for short term data storage (i.e., random access memory), a graphics accelerator 106 for processing graphics request code in accord with preferred embodiments of the invention (see FIG. 4), and a bus coupling all of the prior noted elements of the system 100. The system 100 further includes a display device 108 for displaying the graphics request code processed by the accelerator 106. The graphics accelerator 106 preferably utilizes any well known graphics processing application program interface such as, for example, the OPENGL™ application program interface (available from Silicon Graphics, Inc. of Mountain View, Calif.) for processing three dimensional ("3D") and two dimensional ("2D") graphical request code. In preferred embodiments, the host processor 104 executes a graphical drawing application program such as, for example, the PLANT DESIGN SYSTEM™ drawing program, available from Intergraph Corporation of Huntsville, Ala.

Figure 2:
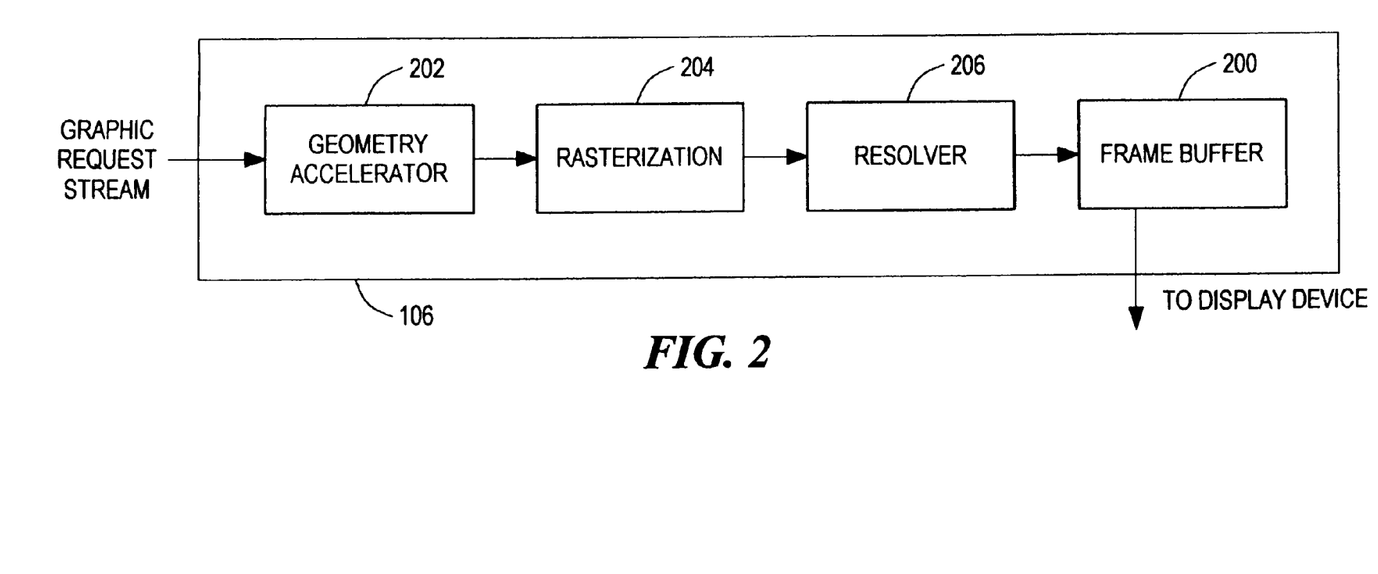
FIG. 2 schematically shows a preferred graphics accelerator that may be utilized in accord with preferred embodiments of the invention.

FIG. 2 shows several elements of the graphics accelerator 106. In preferred embodiments, the graphics accelerator 106 includes a double buffered frame buffer 200 (i.e., having a back buffer and a front buffer) for storing the processed graphics request code in accord with the OPENGL™ interface. Among other things, the graphics accelerator 106 also preferably includes a geometry accelerator 202 for performing geometry operations that commonly are executed in graphics processing, a rasterizer 204 for rasterizing pixels on the display device 108, and a resolver 206 for storing data in the frame buffer 200 and transmitting data from the frame buffer 200 to the display device 108. As noted above, the graphics accelerator 106 preferably is adapted to process both 2D and 3D graphical data. For more information relating to preferred embodiments of the graphics accelerator 106, see, for example, copending United States patent application entitled "MULTI-PROCESSOR GRAPHICS ACCELERATOR", filed on even date herewith and naming Steven J. Heinrich, Stewart G. Carlton, Mark A. Mosley, Matthew E. Buckelew, Clifford A. Whitmore, Dale L. Kirkland, and James L. Deming. as inventors, the disclosure of which is incorporated herein, in its entirety, by reference.

Figure 3:
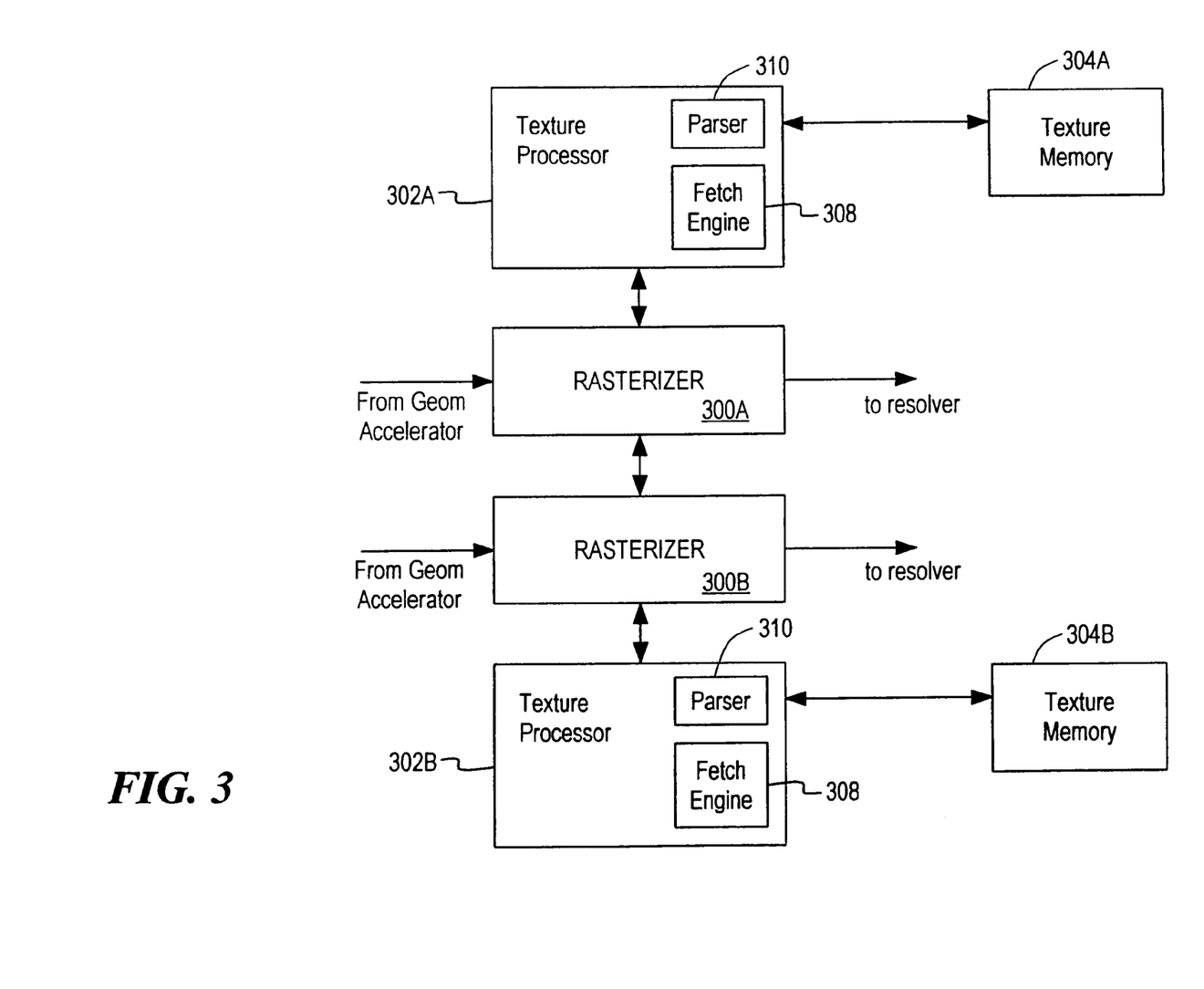
FIG. 3 shows additional details of a preferred embodiment of a rasterization stage shown in FIG. 2.

FIG. 3 shows additional details of a preferred embodiment of the rasterization stage 204 shown in FIG. 2. More particularly, the rasterization stage includes first and second rasterizers 300A and 300B that each deliver output data to the resolver stage 206. The first rasterizer 300A includes a first texture processor 302A with accompanying first texture memory 304A (i.e., buffer). In preferred embodiments, the first texture memory 304A is conventional one dimensional volatile memory. In a similar manner, the second rasterizer 300B includes a second texture processor 302B with accompanying second texture memory 304B. Like the first texture memory 304A, the second texture memory 304B also is conventional one dimensional volatile memory. The texture memory 304A and 304B may be any memory device that operates for such purposes, such as conventional synchronous dynamic random access memory (SDRAM). In preferred embodiments, each texture processor 302A and 302B may be an application specific integrated circuit ("ASIC") configured in accord with conventional processes. Each texture processor 302A and 302B further includes a fetching engine 308 for fetching specified data (discussed below) and a parsing engine 310 (also discussed below) that parses specified data.

In alternative embodiments (not shown), a single texture memory is utilized by each of the different texture processors 302A and 302B. The single texture memory may be partitioned and each partition may be assigned to a single texture processor. Alternatively, the texture map data may be arbitrarily stored in any location of the single texture memory by any of the texture processors on the graphics accelerator.

In accordance with preferred embodiments of the invention, texture maps of varying dimensions may be stored in either of the texture memories 304A and 304B. For example, texture maps of two dimensions, three dimensions, four dimensions and higher dimensions may be stored in either of the one dimensional texture memories. This enables either of the texture processors 302A and 302B to store data in their respective texture memories 304A and 304B in a more efficient manner.

Figure 4:
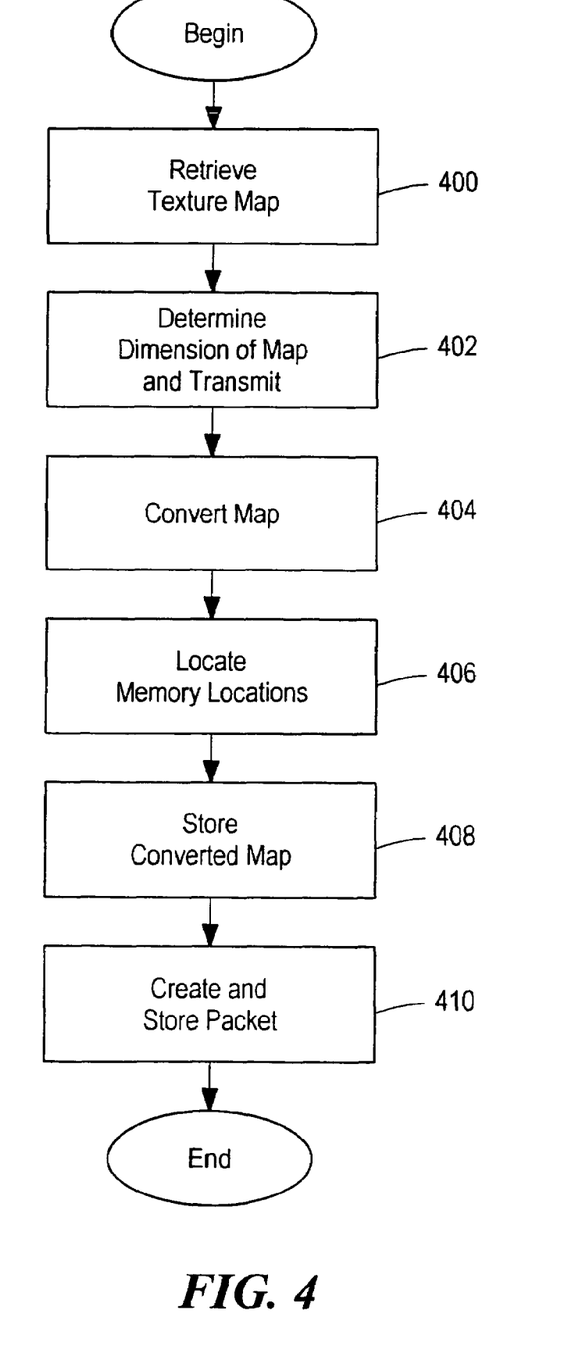
FIG. 4 shows a preferred process of storing texture maps in either of the texture memories shown in FIG. 3.

FIG. 4 shows a preferred process of storing texture maps in either of the texture memories. The first texture processor 302A and its accompanying first texture memory 304A are discussed relative to FIG. 4 by way of example. Accordingly, the process shown in FIG. 4 may be applied to the second texture processor 302B with its second texture memory 304B, or any other texture processor and accompanying texture memory.

The process begins at step 400 in which a texture map is retrieved by the host processor 104 (in response to instructions from a drawing or configuration program) from a library of texture maps in a nonvolatile memory. For example, such library may be stored on a hard disk in the computer system 100. The dimension of the texture map then may be determined by the host processor 104 (e.g., by means of a driver application program executed by the host processor 104) and transmitted to the texture processor 302A with the texture map via a message (step 402).

In response to receipt of the texture map, the texture processor 302A responsively converts the texture map into a one dimensional texture map of one or more texture data blocks (step 404). In preferred embodiments, a texture data block ("block") includes data representing a maximum of 512 texels of a texture map.

Figure 5:
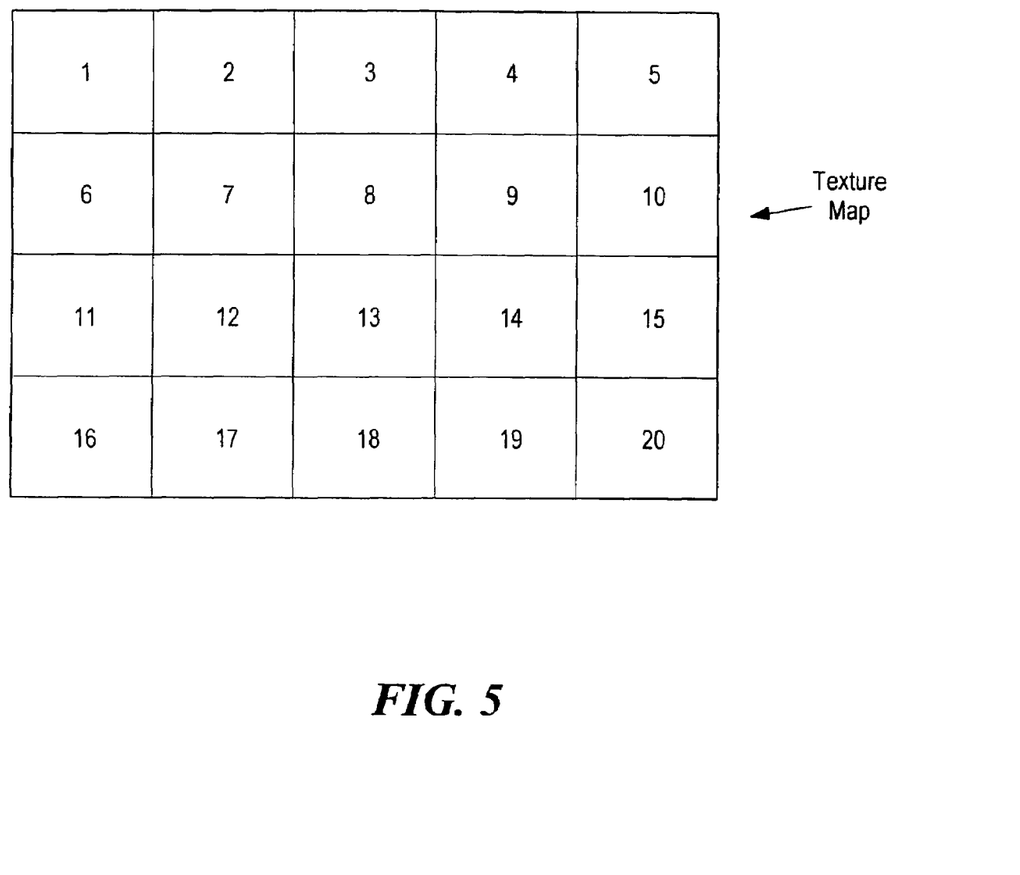
FIG. 5 shows an exemplary two-dimensional texture map as it is converted into a one dimensional texture map.

When converting a two dimensional texture map, each of the blocks of data in the map may be assigned a consecutive sequence number on a block by block basis. This may be completed in any number of ways as known in the art. For example, as shown in FIG. 5, the top left texture data block may be assigned the first sequence number (i.e., "1"), until the lower right block has the last sequence number (i.e., "20"). Accordingly, each block in FIG. 5 is identified by a single address number and thus, is converted into a one dimensional map.

If a texture map is a three dimensional texture map, it may be converted into a two dimensional texture map by dividing it into a plurality of two dimensional texture map planes, and then converting each of the two dimensional map planes into one dimensional texture maps as described above. Higher dimensioned texture maps (e.g., four dimensional texture maps) also may be converted into one dimensional texture maps by utilizing the above noted two and three dimensional conversion methods. It should be noted that other methods known in the art may be utilized.

The process then continues to step 406 in which a plurality of consecutive data blocks in the texture memory 304A are located. The process preferably is done via software executing on the texture processor 302A. Of course, the located data blocks must equal at least the number of resultant data blocks of the converted texture map. For example, at least twenty data consecutive data locations must be located in the texture memory 304A for storing the texture map shown in FIG. 5.

Once the appropriate data blocks are located, the process continues to step 408 in which the converted one dimensional texture maps are stored in the located data locations (i.e., the appropriate blocks) in the texture memory 304A. In preferred embodiments, the texture processor 302A is configured via hardware to store the converted texture map in the texture memory 304A. A texture packet (discussed below and shown in FIG. 7) then is created at step 410 and stored in the texture memory 304A. In preferred embodiments, the location of the texture packet is stored in a packet look-up table that is utilized by the fetching engine 308 to retrieve such packet. Details of the packet retrieval process are discussed below.

Among other data, the texture packet may include the location of the stored converted texture map in the texture memory 304A, and the dimensional size of the texture map prior to being converted. For example, a texture packet may contain data indicating that the texture map shown in FIG. 5 is twenty data blocks long and stored in memory locations 1-20 in the texture memory 304A. Each texture packet in texture memory 304A preferably has a single unique texture map associated with it, and is stored in texture memory 304A in a location that is preconfigured to store texture packets. In some embodiments, the single texture map may include a family of mipmaps (discussed below).

It should be noted that the steps of the process shown in FIG. 4 may be preformed in orders other than that shown in the figure. For example, some steps may be performed simultaneously, while other steps may be performed either before or after each other.

Accordingly, this process enables the texture memory to store texture maps of different dimensions. For example, preferred embodiments of a given texture memory 304A can store texture data for one, two, three and four dimensional texture maps. To that end, the texture memory 304A preferably is logically structured as two banks of linear arrays of memory blocks. Each memory block has a size that corresponds to the size of the texture blocks described above. Accordingly, each block includes 512 data locations that can store up to 512 texels of data. Any block may be located in the texture memory address space by using a map address format that contains a bank select bit, a block address field, and a displacement field. The bank select bit and block address field together form a linear address that points to a unique block within the texture memory 304A. The displacement field locates a given texel within the block.

Each block in a group of blocks that encompass any texture map preferably is logically arranged to correspond with the dimension of the texture map being stored. The following list shows the texture space geometry for one dimensional, two dimensional, and three dimensional memory blocks. The terms depth, width, and height respectively refer to the well known texture space directions known in the art as "R", "S", and "T":

One dimensional texture map: 512 (width) texels;

Two dimensional texture map: 16 (width) by 32 (height) texels; and

Three dimensional texture map: 8 (width) by 8 (height) by 8 (depth) texels.

Even though texture maps are divided into blocks, preferred embodiments permit each such block to be stored across two blocks in memory. Accordingly, the beginning of a block of a texture map may be identified at an offset within a memory block. Below are formulas for determining how many blocks of memory are required by a texture map:

One Dimensional Texture Map $$N=(2^R+2*B+D+511)/512$$

where the division is integral and:

N is the total number of blocks required;

R is the number of bits of resolution in the texture map;

B is one if the texture map has a border and zero if it has no border; and

D is the displacement of the first texel.

Two Dimensional Texture Map $$N=((2^{SR}+2*B+SD+15)/16)/16)*((2^{TR}+2*B+TD+31)/32)$$

where the division is integral and:

N is the total number of blocks required;

SR is the number of bits of resolution in the texture map in the S direction;

TR is the number of bits of resolution in the texture map in the T direction;

B is one if the texture map has a border and zero if it has no border;

SD is the S displacement of the first texel; and

TD is the T displacement of the first texel.

Three Dimensional Texture Map $$N=((2^{SR}+2*B+SD+7)/8)*((2^{TR}+2*B+TD+7)8)*((2^{RR}+2*B+RD+7)/8)$$

where the division is integral and:

N is the total number of blocks required;

SR is the number of bits of resolution in the texture map in the S direction;

TR is the number of bits of resolution in the texture map in the T direction;

RR is the number of bits of resolution in the texture map in the R direction;

B is one if the texture map has a border and zero if it has no border;

SD is the S displacement of the first texel;

TD is the T displacement of the first texel; and

RD is the R displacement of the first texel.

Figure 6:
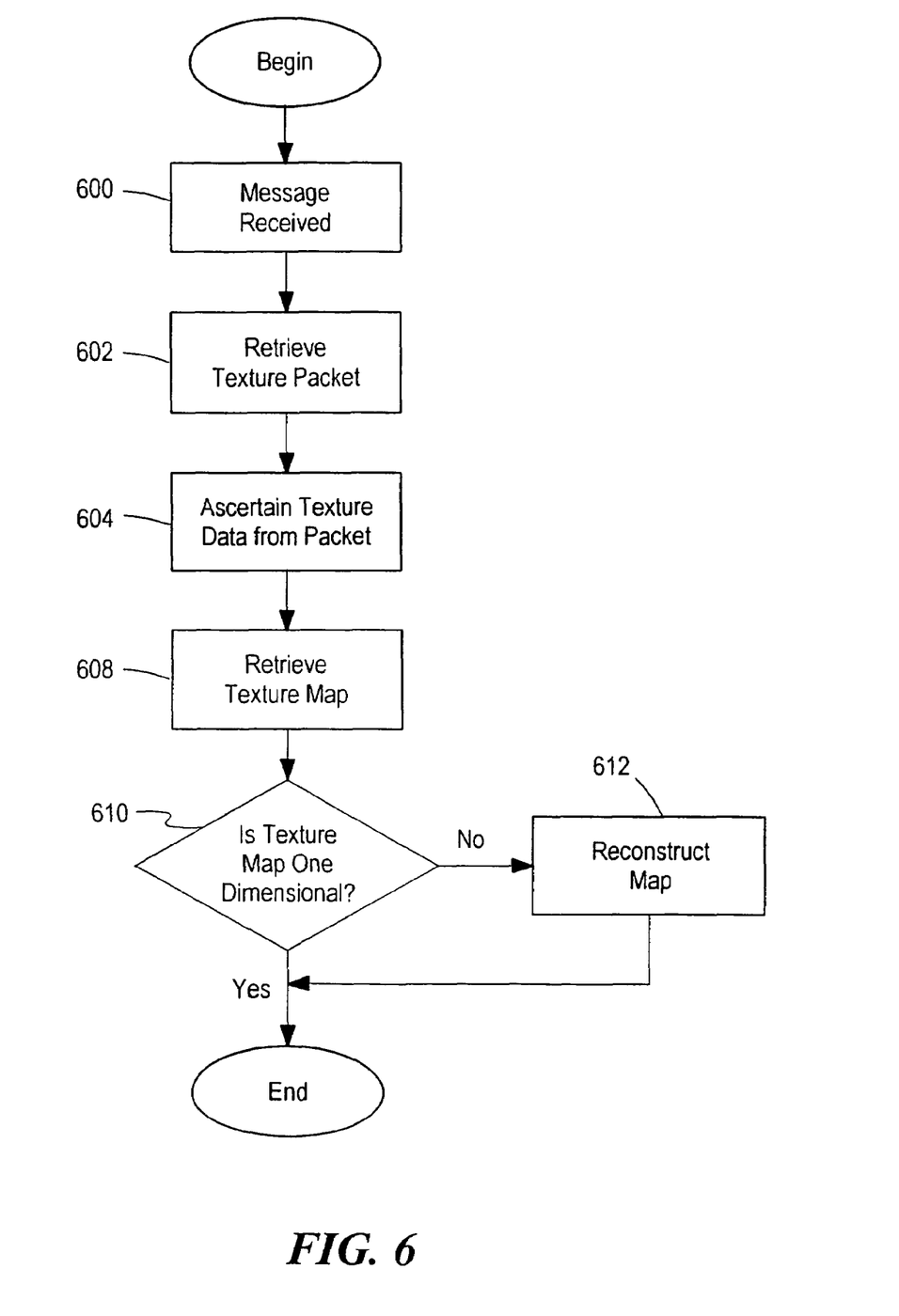
FIG. 6 shows a preferred method of retrieving a texture map from texture memory.

FIG. 6 shows a preferred method of retrieving a texture map from texture memory 304A. The process begins at step 600 in which a message from the host processor 106 is received requesting the texture map. The message may have originated from an executing drawing program executing on the host processor 106. In response to the message, the appropriate texture packet is retrieved from the texture memory 304A by the fetching engine 308 (e.g., a driver) in the texture processor 302A (step 602). To that end, the fetching engine 308 accesses the packet look-up table to determine the location of the appropriate texture packet upon receipt of graphics request code requesting a specified texture map. As noted above, once located, the texture processor retrieves the appropriate texture packet for analysis.

The texture processor 302A then parses the data in the texture packet to determine the location of its associated texture map and/or the dimension of such map. Continuing with the above example, the texture packet associated with the texture map shown in FIG. 5 will include data bits indicating that the texture map is stored at memory locations 1-20, and that such texture map is two dimensional.

The texture map then is retrieved from the texture memory 304A by the texture processor 302A based upon the information in the texture packet (step 608). It then is determined at step 610 if the texture map is one dimensional. If it is a one dimensional texture map, then the process ends. If, however, it is determined that the texture map is not one dimensional, then the texture processor 302A reconstructs the texture map in accord with conventional processes (step 612). For example, the texture processor 302A may perform opposite operations to those executed when converting the texture map to a one dimensional map. Once the texture map is reconstructed and/or retrieved (as the case may be), it may be applied to a graphical image in accordance with conventional processes.

Figure 7:
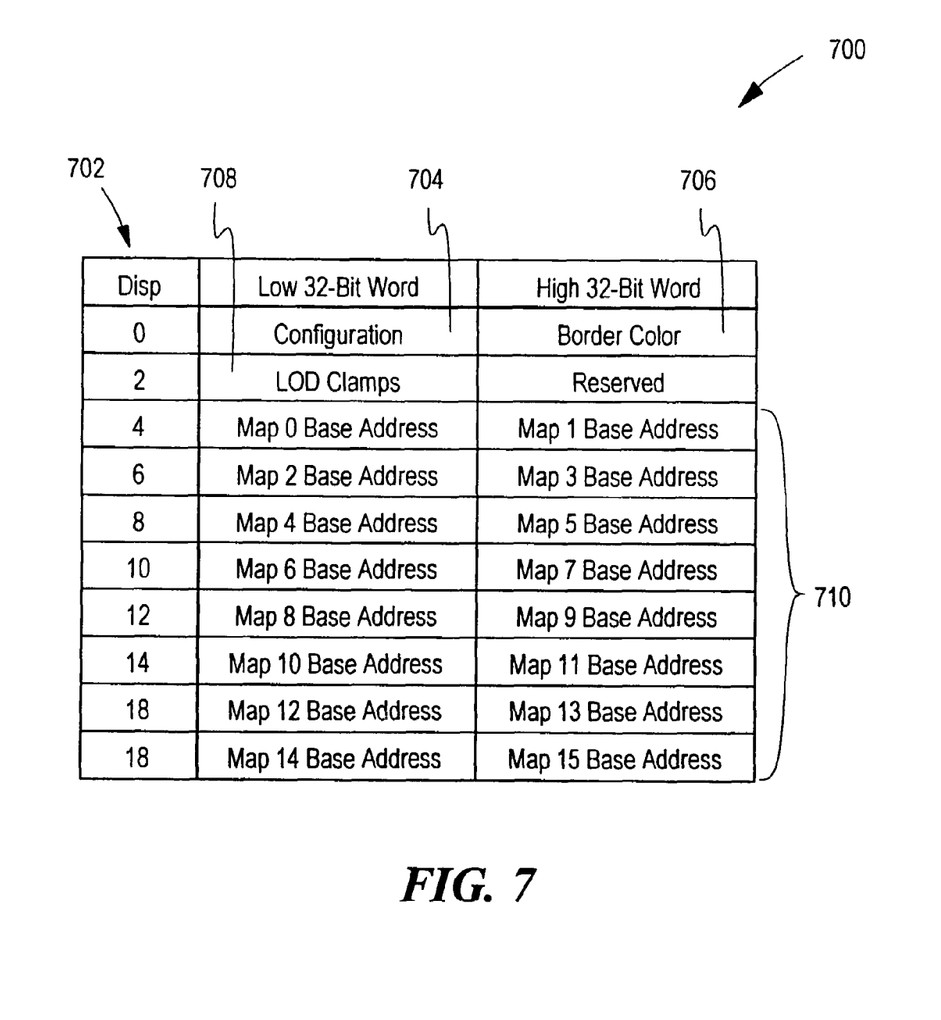
FIG. 7 schematically shows a texture packet configured in accord with preferred embodiments of the invention.

FIG. 7 schematically shows a texture packet 700 configured in accord with preferred embodiments of the invention. Specifically, the texture packet shown in FIG. 7 includes ten rows of sixty-four bit words that each are preceded by a displacement field 702. Each sixty-four bit word is divided into high and low thirty-two bit words (i.e., fields) that each can store specific information. Accordingly, the texture packet includes a configuration field 704 that identifies the dimension of its associated texture map, a border color field 706 identifying the color of the border (if any) of the texture map associated with the texture packet 700, a level of detail clamps field 708, and a plurality of map address fields 710 identifying the address to one texture map, or a set of mipmaps. In preferred embodiments, address data of the associated texture map only is stored in the first address field 710 if such map does not include a plurality of mipmaps. All other address fields 710 thus include no data. In the case where an associated texture map includes a set of mipmaps, the address of each of sixteen mipmaps may be stored in the sixteen address fields 710.

Preferred embodiments of the texture processors 302A and 302B include a plurality of texture registers that collectively define the state of the entire texturing system. Among those registers are a texture configuration register that specifies data relating to texture maps sizes, valid maps, borders, and texel format. A texture environment register specifies other information about a given texture, such as the blend environment, clamp mode, and a level of detail clamp enable. Both of these registers are loaded via a load texture registers request that loads all registers associated with the texture processor 302A. Additional texture registers specify other texturing information, such as the base address of all texture maps, level of detail calculation clamping, and the border and environment blend colors. These additional registers may be loaded with the above noted load texture registers request, or preferably as a group with a setup texture registers request.

Portions of the disclosed apparatus and method may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

I claim:

1. A graphics accelerator for processing a graphical image, the graphics accelerator comprising:
    a single texture buffer for storing texture maps and data relating to the texture maps stored in the texture buffer; and
    a plurality of texture processors that perform texturing operations on the graphical image, the plurality of the texture processors retrieving texture packets from the single texture buffer,
    each texture processor including a fetching engine that retrieves the texture packets, each texture packet being stored in the texture buffer and being associated with a texture map that is different than the texture maps associated with any other texture packet in the texture buffer, each texture packet including data relating to the location of its associated texture map in the texture buffer and data relating to the dimensional type of that texture packet's associated texture map; wherein at least one of said texture processors is configured to convert the associated texture map to a one dimensional texture map by defining a plurality of data blocks within the texture map and then assigning a sequence number to each of the data blocks; and wherein if said data blocks are consecutive in the texture map, they are stored next to each other in memory locations.

2. The graphics accelerator as defined by claim 1 wherein the dimensional type of each texture map is one of a one dimensional texture map, a two dimensional texture map, and a three dimensional texture map.

3. The graphics accelerator as defined by claim 1 wherein the texture processor further includes:
    an input for receiving a texture message indicating that a texture map is to be utilized by the texture processor, the fetching engine responsively retrieving selected texture packets from the single texture buffer in response to receipt of the texture message.

4. The graphics accelerator as defined by claim 3 wherein the texture processor further includes:

a parsing engine for parsing a fetched texture packet and determining information relating to the texture map associated with the fetched texture packet.

5. The graphics accelerator as defined by claim 4 wherein the information relates to the location in the texture buffer of the texture map associated with the fetched texture packet.

6. The graphics accelerator as defined by claim 4 wherein the information relates to the number of dimensions of the texture map associated with the fetched texture packet.

7. A method of storing a texture map in a single linear texture memory of a graphics accelerator, the method comprising:

A. determining the dimension of the texture map by a texture processor;

B. converting by the texture processor the texture map to a one dimensional texture map if the dimension of the texture map is determined to be more than one dimensional, the one dimensional texture map having a first number of data blocks which are consecutive to each other;

C. locating a second number of memory locations which are located next to each other in the single linear texture memory, the first number being equal to the second number; and D. storing the one dimensional texture map in the located memory locations in the single linear texture memory;

wherein the texture map is two dimensional, step B comprising:

B1. defining a plurality of data blocks within the texture map; and

B2. assigning a sequence number to each of the data blocks, the sequence numbers being consecutive numbers; and wherein step D comprises:

D1. consecutively storing each said data block of the one dimensional texture map in the located memory locations if said data blocks are consecutive to each other.

8. A graphics accelerator for processing graphical request code, the graphics accelerator comprising:

a single linear texture memory for storing texture maps;

a plurality of texture processors that applies textures to items to be displayed, the plurality of the texture processors retrieving texture packets from the single linear texture memory, each texture processor including a texture map converter that converts texture maps having dimensions greater than one dimensional to a one dimensional texture map, each dimensional texture map having a first number of data blocks which can be consecutive to each other, the texture processor further including means for locating a second number of memory locations which are located next to each other in the single linear texture memory, the first number being equal to the second number; and means for storing the one dimensional texture map in the located memory locations in the single texture memory;

wherein the texture map converter comprises:

means for defining a plurality of data blocks within the texture map; and means for assigning a sequence number to each of the data blocks, the sequence numbers being consecutive numbers; and the storing means comprises:

means for consecutively storing each data block of the one dimensional texture map in the located memory locations if said data blocks are consecutive to each other.

* * * * *